(12) United States Patent
Jones et al.

(10) Patent No.: US 8,361,599 B2
(45) Date of Patent: *Jan. 29, 2013

(54) DURABLE OPTICAL ELEMENT

(75) Inventors: Clinton L. Jones, Somerset, WI (US);
Brant U. Kolb, Afton, MN (US); Emily S. Goenner, Shoreview, MN (US); John T. Brady, Lino Lakes, MN (US);
Christopher A. Haak, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/004,274

(22) Filed: Jan. 11, 2011

(65) Prior Publication Data

US 2011/0103072 A1    May 5, 2011

Related U.S. Application Data

(63) Continuation of application No. 12/730,458, filed on Mar. 24, 2010, now Pat. No. 7,892,638, which is a continuation of application No. 12/402,525, filed on Mar. 12, 2009, now Pat. No. 7,713,597, which is a continuation of application No. 11/927,760, filed on (Continued)

(51) Int. Cl.
*B32B 3/00* (2006.01)
*B32B 5/00* (2006.01)

(52) U.S. Cl. ........ 428/164; 428/141; 428/156; 428/161; 428/411.1; 428/913

(58) Field of Classification Search ............ 428/1.1, 428/141, 156, 411, 611, 164, 411.1, 913
See application file for complete search history.

(56) References Cited

U.S. PATENT DOCUMENTS

| | | |
|---|---|---|
| 4,487,904 A | 12/1984 | Fukuda et al. |
| 4,542,449 A | 9/1985 | Whitehead |
| 4,568,445 A | 2/1986 | Cates |
| 4,721,377 A | 1/1988 | Fukuda et al. |
| 4,812,032 A | 3/1989 | Fukuda et al. |
| 4,931,523 A | 6/1990 | Watanabe et al. |
| 4,937,172 A | 6/1990 | Gervay |
| 4,962,163 A | 10/1990 | Hefner, Jr. et al. |
| 4,970,135 A | 11/1990 | Kushi et al. |
| 5,066,750 A | 11/1991 | Hefner, Jr. et al. |
| 5,073,462 A | 12/1991 | Gervay |
| 5,149,776 A | 9/1992 | Kushi et al. |
| 5,164,464 A | 11/1992 | Hefner, Jr. et al. |
| 5,175,030 A | 12/1992 | Lu et al. |
| 5,183,597 A | 2/1993 | Lu |
| 5,183,870 A | 2/1993 | Fukushima et al. |

(Continued)

FOREIGN PATENT DOCUMENTS

| | | |
|---|---|---|
| EP | 0 089 041 | 11/1987 |
| EP | 1 014 113 | 6/2000 |

(Continued)

OTHER PUBLICATIONS

U.S. Appl. No. 10/870,366, filed Jun. 17, 2004.

*Primary Examiner* — Shean C Wu
(74) *Attorney, Agent, or Firm* — Carolyn A. Fischer

(57) ABSTRACT

A durable optical film or element includes a polymerized structure having a microstructured surface and a plurality of surface modified colloidal nanoparticles of silica, zirconia, or mixtures thereof. Display devices including the durable microstructured film are also described.

20 Claims, 6 Drawing Sheets

Related U.S. Application Data

Oct. 30, 2007, now Pat. No. 7,524,543, which is a continuation of application No. 11/278,555, filed on Apr. 4, 2006, now Pat. No. 7,309,517, which is a continuation of application No. 10/662,085, filed on Sep. 12, 2003, now Pat. No. 7,074,463.

U.S. PATENT DOCUMENTS

| | | |
|---|---|---|
| 5,247,038 A | 9/1993 | Fukushima et al. |
| 5,354,821 A | 10/1994 | Huver et al. |
| 5,424,339 A | 6/1995 | Zanka et al. |
| 5,486,949 A | 1/1996 | Schrenk et al. |
| 5,612,820 A | 3/1997 | Schrenk et al. |
| 5,626,800 A | 5/1997 | Williams et al. |
| 5,635,278 A | 6/1997 | Williams |
| 5,665,494 A | 9/1997 | Kawabata et al. |
| 5,691,846 A | 11/1997 | Benson, Jr. et al. |
| 5,714,218 A | 2/1998 | Nishio et al. |
| 5,760,126 A | 6/1998 | Engle et al. |
| 5,771,328 A | 6/1998 | Wortman et al. |
| 5,783,120 A | 7/1998 | Ouderkirk et al. |
| 5,825,543 A | 10/1998 | Ouderkirk et al. |
| 5,828,488 A | 10/1998 | Ouderkirk et al. |
| 5,855,983 A | 1/1999 | Williams |
| 5,882,774 A | 3/1999 | Jonza et al. |
| 5,898,523 A | 4/1999 | Smith et al. |
| 5,908,874 A | 6/1999 | Fong et al. |
| 5,917,664 A | 6/1999 | O'Neil et al. |
| 5,919,551 A | 7/1999 | Cobb, Jr. et al. |
| 5,932,626 A | 8/1999 | Fong et al. |
| 5,948,514 A | 9/1999 | Komori et al. |
| 5,969,867 A | 10/1999 | Fukushima |
| 6,057,961 A | 5/2000 | Allen |
| 6,107,364 A | 8/2000 | Fong et al. |
| 6,111,696 A | 8/2000 | Allen et al. |
| 6,218,074 B1 | 4/2001 | Dueber et al. |
| 6,261,700 B1 | 7/2001 | Olson et al. |
| 6,280,063 B1 | 8/2001 | Fong et al. |
| 6,291,070 B1 | 9/2001 | Arpac et al. |
| 6,329,058 B1 | 12/2001 | Arney et al. |
| 6,355,754 B1 | 3/2002 | Olson et al. |
| 6,356,391 B1 | 3/2002 | Gardiner et al. |
| 6,359,170 B1 | 3/2002 | Olson |
| 6,368,682 B1 | 4/2002 | Fong |
| 6,376,590 B2 | 4/2002 | Kolb et al. |
| 6,416,910 B1 | 7/2002 | Iimura et al. |
| 6,432,526 B1 | 8/2002 | Arney et al. |
| 6,521,677 B2 | 2/2003 | Yashiro et al. |
| 6,541,591 B2 | 4/2003 | Olson et al. |
| 6,593,392 B2 | 7/2003 | Wang |
| 6,599,631 B2 | 7/2003 | Kambe et al. |
| 6,645,569 B2 | 11/2003 | Cramer et al. |
| 6,656,990 B2 | 12/2003 | Shustack et al. |
| 6,727,309 B1 | 4/2004 | Paiva et al. |
| 6,809,889 B2 | 10/2004 | Tokuda et al. |
| 6,844,950 B2 | 1/2005 | Ja Chisholm et al. |
| 6,846,089 B2 | 1/2005 | Stevenson et al. |
| 7,046,439 B2 | 5/2006 | Kaminsky et al. |
| 7,074,463 B2 | 7/2006 | Jones et al. |
| 7,179,513 B2 | 2/2007 | Jones et al. |
| 7,309,517 B2 | 12/2007 | Jones et al. |
| 7,326,448 B2 | 2/2008 | Jones et al. |
| 7,524,543 B2 | 4/2009 | Jones et al. |
| 7,547,467 B2 * | 6/2009 | Olson et al. .................... 428/1.3 |
| 7,622,164 B2 | 11/2009 | Jones et al. |
| 7,713,597 B2 * | 5/2010 | Jones et al. .................... 428/1.3 |
| 7,763,331 B2 | 7/2010 | Jones et al. |
| 2002/0057497 A1 | 5/2002 | Gardiner et al. |
| 2003/0021566 A1 | 1/2003 | Shustack et al. |
| 2003/0100693 A1 | 5/2003 | Olson et al. |
| 2003/0129385 A1 | 7/2003 | Hojo et al. |
| 2003/0165680 A1 | 9/2003 | Brady et al. |
| 2003/0175004 A1 | 9/2003 | Garito et al. |
| 2003/0180029 A1 | 9/2003 | Garito et al. |
| 2004/0021133 A1 | 2/2004 | Nagpal |
| 2004/0131826 A1 | 7/2004 | Chisholm et al. |
| 2004/0132858 A1 | 7/2004 | Chisholm et al. |
| 2004/0229059 A1 | 11/2004 | Kausch |
| 2004/0233526 A1 | 11/2004 | Kaminsky et al. |
| 2005/0049325 A1 | 3/2005 | Chisholm et al. |
| 2005/0059766 A1 | 3/2005 | Jones et al. |
| 2005/0063898 A1 | 3/2005 | Ja Chisholm |
| 2005/0136252 A1 | 6/2005 | Chisholm et al. |
| 2005/0151119 A1 | 7/2005 | Jones et al. |
| 2005/0170158 A1 | 8/2005 | Hattori |
| 2006/0077322 A1 | 4/2006 | Chuang et al. |
| 2006/0210726 A1 | 9/2006 | Jones et al. |
| 2006/0226583 A1 | 10/2006 | Marushin et al. |
| 2007/0082218 A1 | 4/2007 | Chuang et al. |
| 2007/0112097 A1 | 5/2007 | Olson et al. |
| 2008/0030829 A1 | 2/2008 | Jones et al. |
| 2008/0050560 A1 | 2/2008 | Jones et al. |
| 2009/0176061 A1 | 7/2009 | Jones et al. |
| 2010/0178470 A1 | 7/2010 | Jones et al. |

FOREIGN PATENT DOCUMENTS

| | | |
|---|---|---|
| EP | 1 510 557 | 3/2005 |
| JP | 6-059107 | 3/1994 |
| JP | 08-217991 | 8/1996 |
| JP | 11-223703 | 8/1999 |
| JP | 2000-147208 | 5/2000 |
| JP | 2001-133607 | 5/2001 |
| JP | 2003-512287 | 4/2003 |
| JP | 2003-535375 | 11/2003 |
| JP | 2003-342338 | 12/2003 |
| JP | 2004-145157 | 5/2004 |
| JP | 2005-314661 | 11/2005 |
| JP | 2005-316219 | 11/2005 |
| WO | WO 96/19347 | 6/1996 |
| WO | WO 98/50340 | 11/1998 |
| WO | WO 98/50441 | 11/1998 |
| WO | WO 98/50442 | 11/1998 |
| WO | WO 98/50805 | 11/1998 |
| WO | WO 98/50806 | 11/1998 |
| WO | WO 00/06495 | 2/2000 |
| WO | WO 00/14050 | 3/2000 |
| WO | WO 01/29138 | 4/2001 |
| WO | WO 01/30702 | 5/2001 |
| WO | WO 01/51539 | 7/2001 |
| WO | WO 01/92980 | 12/2001 |
| WO | WO 02/00594 | 1/2002 |
| WO | WO 02/45129 | 6/2002 |
| WO | WO 02/051892 | 7/2002 |
| WO | WO 03/033558 | 4/2003 |
| WO | WO 03/041875 | 5/2003 |
| WO | WO 03/045846 | 6/2003 |
| WO | WO 03/076528 | 9/2003 |
| WO | WO 2004/042434 | 5/2004 |
| WO | WO 2005/103815 | 11/2005 |
| WO | WO 2007/046649 | 4/2007 |

* cited by examiner

DURABLE OPTICAL ELEMENT

RELATED APPLICATION DATA

This application is a continuation of application Ser. No. 12/730,458, filed Mar. 24, 2010 now U.S. Pat. No. 7,892,638, now allowed, which is a continuation of application Ser. No. 12/402,525, filed Mar. 12, 2009, issued as U.S. Pat. No. 7,713,597, which is a continuation of application Ser. No. 11/927,760, filed Oct. 30, 2007, issued as U.S. Pat. No. 7,524,543; which is a continuation of Ser. No. 11/278,555, filed Apr. 4, 2006, issued as U.S. Pat. No. 7,309,517; which is a continuation of application Ser. No. 10/662,085, filed Sep. 12, 2003, issued as U.S. Pat. No. 7,074,463.

BACKGROUND OF THE INVENTION

The present invention relates generally to durable articles. More particularly, the present invention relates to increasing the durability of a microstructured bearing article such as, for example, a brightness enhancing film, an optical lighting film or a reflective element.

Microstructure bearing articles, such as, brightness enhancing films, optical turning films or reflective elements, are made in a variety of forms. One such form includes a series of alternating tips and grooves. One example of such a form is brightness enhancing film, which has a regular repeating pattern of symmetrical tips and grooves. Other examples include patterns in which the tips and grooves are not symmetrical and in which the size, orientation, or distance between the tips and grooves is not uniform.

One drawback of current brightness enhancing films and optical lighting films, and the like, is that the tips of the microstructure are susceptible to mechanical damage. For example, light scraping with a fingernail or a hard, relatively sharp edge can cause the tips of the microstructure to break or fracture. Conditions sufficient to break the tips of prior art microstructures are experienced during normal handling of brightness enhancing films, such as, in the manufacturing of liquid crystal displays for laptop computers.

When microstructure peaks are broken, the reflective and refractive properties of the affected peaks are reduced and the transmitted light scattered to virtually all forward angles. Hence, when the brightness enhancing film is in a display, and the display is viewed straight on, scratches in the brightness enhancing film are less bright than the surrounding, undamaged area of the film. However, when the display is viewed at an angle near or greater than the "cutoff" angle, the angle at which the image on the display is no longer viewable, the scratches look substantially brighter than the surrounding, undamaged area of the film. In both situations, the scratches are very objectionable from a cosmetic standpoint, and brightness enhancing film with more than a very few, minor scratches is unacceptable for use in a liquid crystal display.

SUMMARY OF THE INVENTION

Generally, the present invention relates to durable articles useful for a variety of applications including, for example, optical elements such as, for example, microstructured films, as well as the displays and other devices containing the microstructured films.

In one embodiment, a durable optical film includes a polymerized optical film structure having a microstructured surface and a plurality of surface modified colloidal nanoparticles of silica, zirconia, or mixtures thereof.

In another embodiment, a durable brightness enhancing film includes a polymerized brightness enhancing structure having a plurality of surface modified colloidal nanoparticles.

In a further embodiment, a device includes a lighting device having a light-emitting surface and a brightness enhancing article placed substantially parallel to the light-emitting surface. The brightness enhancing article includes a polymerized structure having a plurality of surface modified colloidal nanoparticles.

In another embodiment, a durable optical turning film includes a first surface and a second surface. An array of prisms is formed in the first surface. The array of prisms has a plurality of first prisms, each of the first prisms having a first prism angular orientation with respect to a normal to the first surface and a plurality of second prisms, each of the second prisms having a second prism angular orientation, different from the first angular orientation, with respect to the normal. The array of prisms has a plurality of surface modified colloidal nanoparticles.

In another embodiment an illumination device includes a lighting source having a lightguide having a light-emitting surface and an optical turning film placed substantially parallel to said lightguide. The turning film having a first surface and a second surface and an array of prisms formed on the first surface. The turning film disposed with the first surface disposed in relation to the light-emitting surface such that light rays exiting the light-emitting surface of the lightguide encounter the array of prisms and are reflected and refracted by the array of prisms such that the light rays exit the turning film via the second surface and substantially along a desired angular direction. The array of prisms includes a first plurality of prisms, each of the first plurality of prisms having a first prism configuration, and a second plurality of prisms each having a second prism configuration, different than the first prism configuration. The first prism configuration and the second prism configuration being such the light rays exiting the second surface correspond to a substantially uniform sampling of the light rays entering the lightguide. The optical turning film comprising a plurality of surface modified colloidal nanoparticles.

In another embodiment, retro-reflective film includes a retro-reflective polymerized structure having a plurality of surface modified colloidal nanoparticles.

In another embodiment, a durable optical element includes a polymerized optical element structure having a microstructured surface and a plurality of surface modified colloidal nanoparticles of silica, zirconia, or mixtures thereof.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
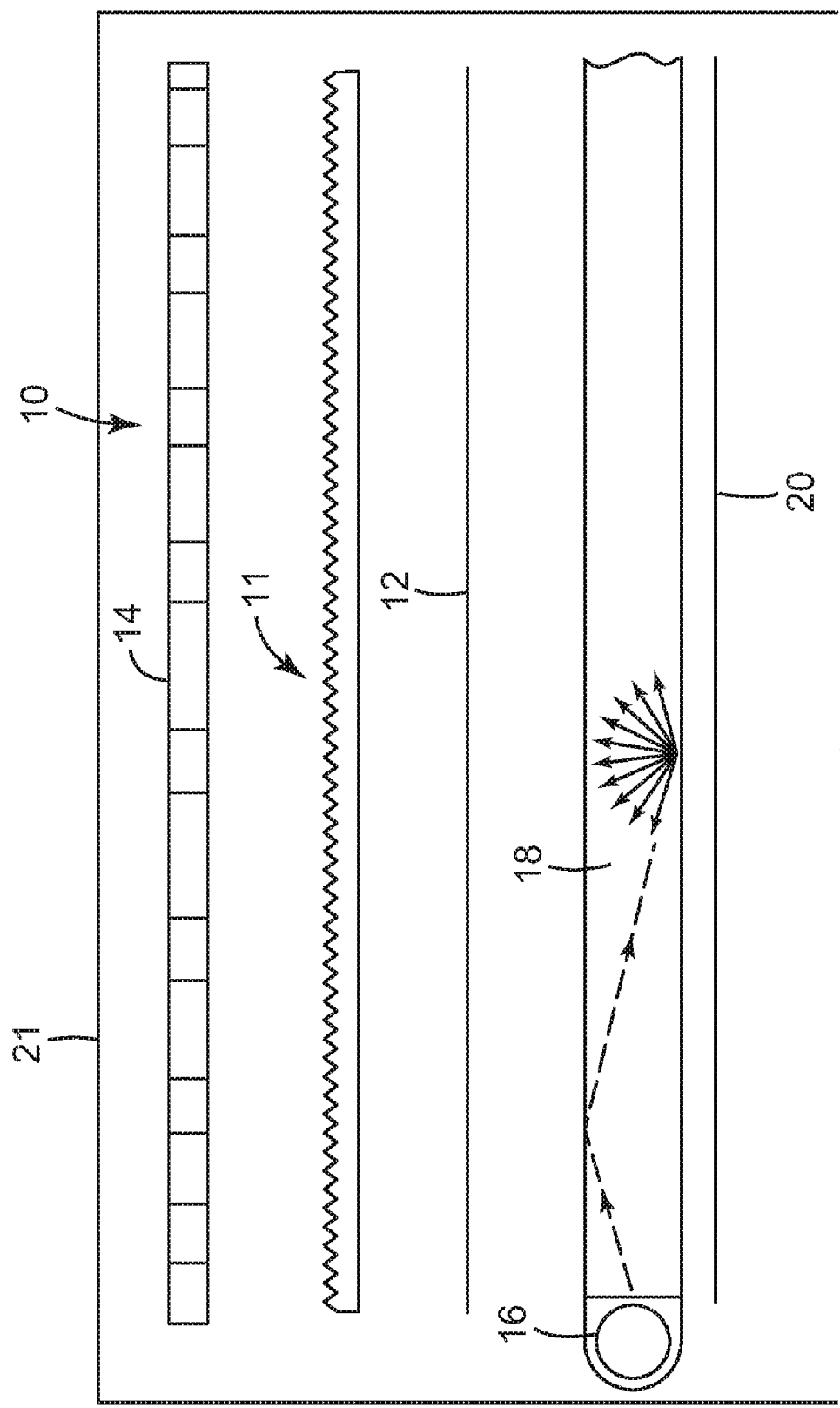
FIG. 1 is a schematic view of an illustrative micro-structured article of the present invention in a backlit liquid crystal display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The durable optical elements and process for making durable optical elements of the present invention are believed to be applicable to a variety of applications needing durable micro-structured film including, for example, brightness enhancing films, optical turning films as well as the displays and other devices containing the durable microstructures. While the present invention is not so limited, an appreciation of various aspects of the invention will be gained through a discussion of the examples provided below.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

Retro-reflective films generally are capable of returning a significant percentage of incident light at relatively high entrance angles regardless of the rotational orientation of the sheeting about an axis perpendicular to its major surface. Cube corner retro-reflective film can include a body portion typically having a substantially planar base surface and a structured surface comprising a plurality of cube corner elements opposite the base surface. Each cube corner element can include three mutually substantially perpendicular optical faces that typically intersect at a single reference point, or apex. The base of the cube corner element acts as an aperture through which light is transmitted into the cube corner element. In use, light incident on the base surface of the sheeting is refracted at the base surface of the sheeting, transmitted through the respective bases of the cube corner elements disposed on the sheeting, reflected from each of the three perpendicular cube corner optical faces, and redirected toward the light source, as described in U.S. Pat. No. 5,898,523, which is incorporated by reference herein.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "refractive index" is defined herein as the absolute refractive index of a material which is understood to be the ratio of the speed of electromagnetic radiation in free space to the speed of the radiation in that material. The refractive index can be measured using known methods and is generally measured using an Abbe Refractometer in the visible light region.

The term "colloidal" is defined herein to mean particles (primary particles or associated primary particles) with a diameter less than about 100 nm.

The term "associated particles" as used herein refers to a grouping of two or more primary particles that are aggregated and/or agglomerated.

The term "aggregation" as used herein is descriptive of a strong association between primary particles which may be chemically bound to one another. The breakdown of aggregates into smaller particles is difficult to achieve.

The term "agglomeration" as used herein is descriptive of a weak association of primary particles which may be held together by charge or polarity and can be broken down into smaller entities.

The term "primary particle size" is defined herein as the size of a non-associated single particle.

The term "sol" is defined herein as a dispersion or suspension of colloidal particles in a liquid phase.

The term "surface modified colloidal nanoparticles" refers to nanoparticles, each with a modified surface such that the nanoparticles provide a stable dispersion.

The term "stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

The term "gain" is defined herein as a measure of the improvement in the apparent on-axis brightness of a display due to a brightness enhancing film, and is a property of the optical material, and also of the geometry of the brightness enhancing film. Typically, the viewing angle decreases as the gain increases. A high gain is desired for a brightness enhancing film because improved gain provides an effective increase in the brightness of the backlight display.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The polymerizable composition is a substantially solvent-free radiation curable inorganic filled organic composite. The organic phase of the composition consists of a reactive diluent, oligomer, crosslinking monomer and optionally includes a photoinitiator. The organic component can have a refractive index of at least 1.50 for most product applications and exhibit significant durability in the cured form. Lower refractive index compositions, those less than 1.50, are generally easier to achieve based on the vast selection of commercially available materials in this refractive index region. Lower refractive index resins have usefulness in some applications those skilled in the art would recognize. High transmittance in the visible light spectrum is also desired. Ideally, the composition minimizes the effect of any induced scratch while optimizing the desired optical properties and maintaining a Tg (glass transition temperature) significantly high enough to avoid other brightness enhancing product failure modes such as those described in U.S. Pat. No. 5,626,800.

The polymerizable composition also contains inorganic oxide particles whose size is chosen to avoid significant visible light scattering. The inorganic oxide particle selected can impart refractive index or scratch resistance increase or both. It may be desirable to use a mix of inorganic oxide particle types to optimize an optical or material property and to lower total composition cost. The total composition of inorganic oxide particles, organic monomers and oligomers preferably has a refractive index greater than 1.56. Use of inorganic oxide filled polymers allows one to achieve durability unobtainable with unfilled resins alone. The cured composite composition should meet the necessary product properties of durability, high visible light transmittance, optical clarity, high index of refraction, environmental stability, and photo stability while possessing the uncured composition requirements of low viscosity, shelf stability (composition should not change chemically over time, particles should not settle or phase separate) and are energy curable in time scales preferably less than five minutes, and the composition is substantially solvent free. Compositions with high multi-functional monomer amounts and reactively functionalized inorganic oxide particles maintain the form of the original master as well as the existing brightness enhancing films available from 3M, Co.

The present invention describes a durable article that includes a polymerized structure having a plurality of surface modified colloidal nanoparticles. The durable article can be an optical element or optical product constructed of a base layer and an optical layer. The base layer and optical layer can be formed from the same or different polymer material. The polymerized structure having a plurality of surface modified colloidal nanoparticles has the advantage that it can be formed in a solvent-less system.

Surface modified colloidal nanoparticles are present in the polymerized structure in an amount effective to enhance the durability and/or refractive index of the article or optical element. The surface modified colloidal nanoparticles described herein can have a variety of desirable attributes, including for example; nanoparticle compatibility with resin systems such that the nanoparticles form stable dispersions within the resin systems, surface modification can provide reactivity of the nanoparticle with the resin system making the composite more durable, properly surface modified nanoparticles added to resin systems provide a low impact on uncured composition viscosity. A combination of surface modifications can be used to manipulate the uncured and cured properties of the composition. Appropriately surface modified nanoparticles can improve optical and physical properties of the optical element such as, for example, improve resin mechanical strength, minimize viscosity changes while increasing solid volume loading in the resin system and maintain optical clarity while increasing solid volume loading in the resin system.

The surface modified colloidal nanoparticles can be oxide particles having a particle size or associated particle size of greater than 1 nm and less than 100 nm. Their measurements can be based on transmission electron microscopy (TEM). The nanoparticles can include metal oxides such as, for example, alumina, tin oxides, antimony oxides, silica, zirconia, titania, mixtures thereof, or mixed oxides thereof. Surface modified colloidal nanoparticles can be substantially fully condensed.

Silica nanoparticles can have a particle size from 5 to 75 nm or 10 to 30 nm or 20 nm. Silica nanoparticles can be present in the durable article or optical element in an amount from 10 to 60 wt %, or 10 to 40 wt %. Silicas for use in the materials of the invention are commercially available from Nalco Chemical Co. (Naperville, Ill.) under the product designation NALCO COLLOIDAL SILICAS. For example, silicas include NALCO products 1040, 1042, 1050, 1060, 2327 and 2329. Suitable fumed silicas include for example, products sold under the tradename, AEROSIL series OX-50, -130, -150, and -200 available from DeGussa AG, (Hanau, Germany), and CAB-O-SPERSE 2095, CAB-O-SPERSE A105, CAB-O-SIL M5 available from Cabot Corp. (Tuscola, Ill.).

Zirconia nanoparticles can have a particle size from 5 to 50 nm, or 5 to 15 nm, or 10 nm. Zirconia nanoparticles can be present in the durable article or optical element in an amount from 10 to 70 wt %, or 30 to 50 wt %. Zirconias for use in materials of the invention are commercially available from Nalco Chemical Co. (Naperville, Ill.) under the product designation NALCO OOSSOO8.

Titania, antimony oxides, alumina, tin oxides, and/or mixed metal oxide nanoparticles can have a particle size or associated particle size from 5 to 50 nm, or 5 to 15 nm, or 10 nm. Titania, antimony oxides, alumina, tin oxides, and/or mixed metal oxide nanoparticles can be present in the durable article or optical element in an amount from 10 to 70 wt %, or 30 to 50 wt %. Mixed metal oxide for use in materials of the invention are commercially available from Catalysts & Chemical Industries Corp., (Kawasaki, Japan) under the product designation Optolake 3.

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing.

The nanoparticles of the present invention are preferably treated with a surface treatment agent. In general a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids do not require elevated temperatures or extended time.

Representative embodiments of surface treatment agents suitable for the durable compositions include compounds such as, for example, isooctyl trimethoxy-silane, N-(3-triethoxysilylpropyl)methoxyethoxyethoxyethyl carbamate (PEG3TES), Silquest A1230, N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof.

The surface modification of the particles in the colloidal dispersion can be accomplished in a variety of ways. The process involves the mixture of an inorganic dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In a preferred method, the mixture can be reacted at about 85 degree C. for about 24 hours, resulting in the surface modified sol. In a preferred method, where metal oxides are surface modified the surface treatment of the metal oxide can preferably involve the adsorption of acidic molecules to the particle surface. The surface modification of the heavy metal oxide preferably takes place at room temperature.

The surface modification of ZrO2 with silanes can be accomplished under acidic conditions or basic conditions. In one preferred case the silanes are preferably heated under acid conditions for a suitable period of time. At which time the dispersion is combined with aqueous ammonia (or other base). This method allows removal of the acid counter ion from the ZrO2 surface as well as reaction with the silane. In a preferred method the particles are precipitated from the dispersion and separated from the liquid phase.

The surface modified particles can then be incorporated into the curable resin in various methods. In a preferred aspect, a solvent exchange procedure is utilized whereby the resin is added to the surface modified sol, followed by removal of the water and co-solvent (if used) via evaporation, thus leaving the particles dispersed in the polyerizable resin. The evaporation step can be accomplished for example, via distillation, rotary evaporation or oven drying.

In another aspect, the surface modified particles can be extracted into a water immiscible solvent followed by solvent exchange, if so desired.

Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

A combination of surface modifying agents can be useful, wherein at least one of the agents has a functional group co-polymerizable with a hardenable resin. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

The optical layer or micro-structured layer can be formed from the listing of polymeric material described herein. This layer can be formed from high index of refraction materials, including monomers such as high index of refraction (meth) acrylate monomers, halogenated monomers, and other such high index of refraction monomers as are known in the art. See, for example, U.S. Pat. Nos. 4,568,445; 4,721,377; 4,812,032; and 5,424,339, all incorporated by reference herein. The thickness of this optical or micro-structured layer can be in the range of about 10 to about 200 microns.

Suitable polymeric resins to form the optical or micro-structured layer include the u.v.-polymerized products of acrylate and/or methacrylate monomers. A suitable resin is the u.v.-polymerized product of a brominated, alkyl-substituted phenyl acrylate or methacrylate (e.g., 4,6-dibromo-2-sec-butyl phenyl acrylate), a methyl styrene monomer, a brominated epoxy diacrylate, 2-phenoxyethyl acrylate, and a hexa-functional aromatic urethane acrylate oligomer, as described in U.S. Pat. No. 6,355,754, incorporated herein by reference.

While most types of energy polymerizable telechelic monomers and oligomers are useful for the present invention, acrylates are preferred because of their high reactivity. Generally, formulations useful in the present invention contain reactive diluents in the amount useful to attain viscosities conducive to the method described in below. The polymerizable composition should be of flowable viscosity that is low enough that air bubbles do not become entrapped in the composition and that the full microstructure geometry is obtained. Reactive diluents are typically mono- or di-functional monomers such as SR-339, SR-256, SR-379, SR-395, SR-440, SR-506, CD-611, SR-212, SR-230, SR-238, and SR-247 available from Sartomer Co., Exton, Pa. Reactive diluents with refractive index greater than 1.50, like SR-339, are preferred. Oligomeric materials, particularly those with high refractive index, are also useful in this invention. The oligomeric material contributes bulk optical and durable properties to the cured composition. Typical useful oligomers and oligomeric blends include CN-120, CN-104, CN-115, CN-116, CN-117, CN-118, CN-119, CN-970A60, CN-972, CN-973A80, CN-975 available from Sartomer Co., Exton, Pa. and Ebecryl 1608, 3200, 3201, 3302, 3605, 3700, 3701, 608, RDX-51027, 220, 9220, 4827, 4849, 6602, 6700-20T available from Surface Specialties, Smyrna, Ga. Additionally, a multi-functional crosslinker is necessary to achieve a durable, high crosslink density composite matrix. Examples of multi-functional monomers include SR-295, SR-444, SR-351, SR-399, SR-355, and SR-368 available from Sartomer Co., Exton, Pa. and PETA-K, PETIA and TMPTA-N available from Surface Specialties, Smyrna, Ga.

Multi-functional monomers can be used as crosslinking agents to increase the glass transition temperature of the polymer that results from the polymerizing of the polymerizable composition. The glass transition temperature can be measured by methods known in the art, such as Differential Scanning Calorimetry (DSC), modulated DSC, or Dynamic Mechanical Analysis. The polymeric composition can be crosslinked sufficiently to provide a glass transition temperature that is greater than 45° C.

Monomer compositions useful in this invention can have a melting point that is below about 50° C. The monomer composition can be a liquid at room temperature. Monomer compositions useful in this invention can be polymerized by conventional free radical polymerization methods.

Examples of initiators include, organic peroxides, azo compounds, quinines, nitro compounds, acyl halides, hydrazones, mercapto compounds, pyrylium compounds, imidazoles, chlorotriazines, benzoin, benzoin alkyl ethers, di-ketones, phenones, and the like. Commercially available photoinitiators include, but not limited to, those available commercially from Ciba Geigy under the trade designations DAROCUR 1173, DAROCUR 4265, IRGACURE 651, IRGACURE 1800, IRGACURE 369, IRGACURE 1700, and IRGACURE 907, IRGACURE 819. Phosphine oxide derivatives are preferred, such as LUCIRIN TPO, which is 2,4,6-trimethylbenzoyl diphenyl phosphine oxide, available from BASF, Charlotte, N.C. A photoinitiator can be used at a concentration of about 0.1 to 10 weight percent or about 0.1 to 5 weight percent.

The polymerizable compositions described herein can also contain one or more other useful components that, as will be appreciated by those of skill in the art, can be useful in such a polymerizable composition. For example, the polymerizable composition can include one or more surfactants, pigments, fillers, polymerization inhibitors, antioxidants, anti-static agents, and other possible ingredients. Such components can be included in amounts known to be effective. Surfactants such as fluorosurfactants can be included in the polymerizable composition to reduce surface tension, improve wetting, allow smoother coating and fewer coating defects.

The polymerizable composition can be formed from a hard resin. The term "hard resin" means that the resulting polymer exhibits an elongation at break of less than 50 or 40 or 30 or 20 or 10 or 5 percent when evaluated according to the ASTM D-882-91 procedure. The hard resin polymer also can exhibit a tensile modulus of greater than 100 kpsi ($6.89 \times 10^8$ pascals) when evaluated according to the ASTM D-882-91 procedure.

The optical layer can directly contact the base layer or be optically coupled to the base layer, and can be of a size, shape and thickness allowing the optical layer to direct or concentrate the flow of light. The optical layer can have a structured or micro-structured surface that can have any of a number of useful patterns as described below and shown in the FIGURES and EXAMPLES. The micro-structured surface can be a plurality of parallel longitudinal ridges extending along a length or width of the film. These ridges can be formed from a plurality of prism apexes. These apexes can be sharp, rounded or flattened or truncated. These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancing film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. Preferably, a base material is chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed phase suspended or dispersed in a continuous phase.

For some optical products such as microstructure-bearing products such as, for example, brightness enhancing films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microtine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each of which are incorporated herein by reference. The use of these polarizer films in combination with a brightness enhancing film has been described in U.S. Pat. No. 6,111,696, incorporated by reference herein.

A second example of a polarizing film that can be used as a base are those films described in U.S. Pat. No. 5,882,774, also incorporated herein by reference. One example of such films that are available commercially are the multilayer films sold under the trade designation DBEF (Dual Brightness Enhancement Film) from 3M. The use of such multilayer polarizing optical film in a brightness enhancing film has been described in U.S. Pat. No. 5,828,488, incorporated herein by reference.

This list of base materials is not exclusive, and as will be appreciated by those of skill in the art, other polarizing and non-polarizing films can also be useful as the base for the optical products of the invention. These base materials can be combined with any number of other films including, for example, polarizing films to form multilayer structures. A short list of additional base materials can include those films described in U.S. Pat. Nos. 5,612,820 and 5,486,949, among others. The thickness of a particular base can also depend on the above-described requirements of the optical product.

Durable microstructure-bearing articles can be constructed in a variety of forms, including those having a series of alternating tips and grooves sufficient to produce a totally internal reflecting film. An example of such a film is a brightness enhancing film having a regular repeating pattern of symmetrical tips and grooves, while other examples have patterns in which the tips and grooves are not symmetrical. Examples of microstructure bearing articles useful as brightness enhancing films are described by U.S. Pat. Nos. 5,175,030 and 5,183,597, which are both incorporated herein by reference.

According to these patents, a microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under polymerization conditions and that preferably has a surface energy that permits clean removal of the polymerized material from the master. The particular method used to create the microstructure topography described herein can be similar to the molding process described in U.S. Pat. No. 5,691,846 which is incorporated by reference herein. The micro-structure article according to the invention can be formed from a continuous process at any desired length such as, for example, 5, 10, 100, 1000 meters or more.

The durable article can be used in applications needing durable micro-structured film including, for example, brightness enhancing films. The structure of these durable brightness enhancing films can include a wide variety of microstructured films such as, for example, U.S. Pat. No. 5,771,328, U.S. Pat. No. 5,917,664, U.S. Pat. No. 5,919,551, U.S. Pat. No. 6,280,063, and U.S. Pat. No. 6,356,391, all incorporated by reference herein.

A backlit liquid crystal display generally indicated at 10 in FIG. 1 includes a brightness enhancing film 11 of the present invention that can be positioned between a diffuser 12 and a liquid crystal display panel 14. The backlit liquid crystal display can also includes a light source 16 such as a fluorescent lamp, a light guide 18 for transporting light for reflection toward the liquid crystal display panel 14, and a white reflector 20 for reflecting light also toward the liquid crystal display panel. The brightness enhancing film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The brightness enhancing film 11 in the backlit liquid crystal display is useful in equipment such as computer displays (laptop displays and computer monitors), televisions, video recorders, mobile communication devices, handheld devices (i.e. cellphone, PDA), automobile and avionic instrument displays, and the like, represented by reference character 21.

Figure 2:
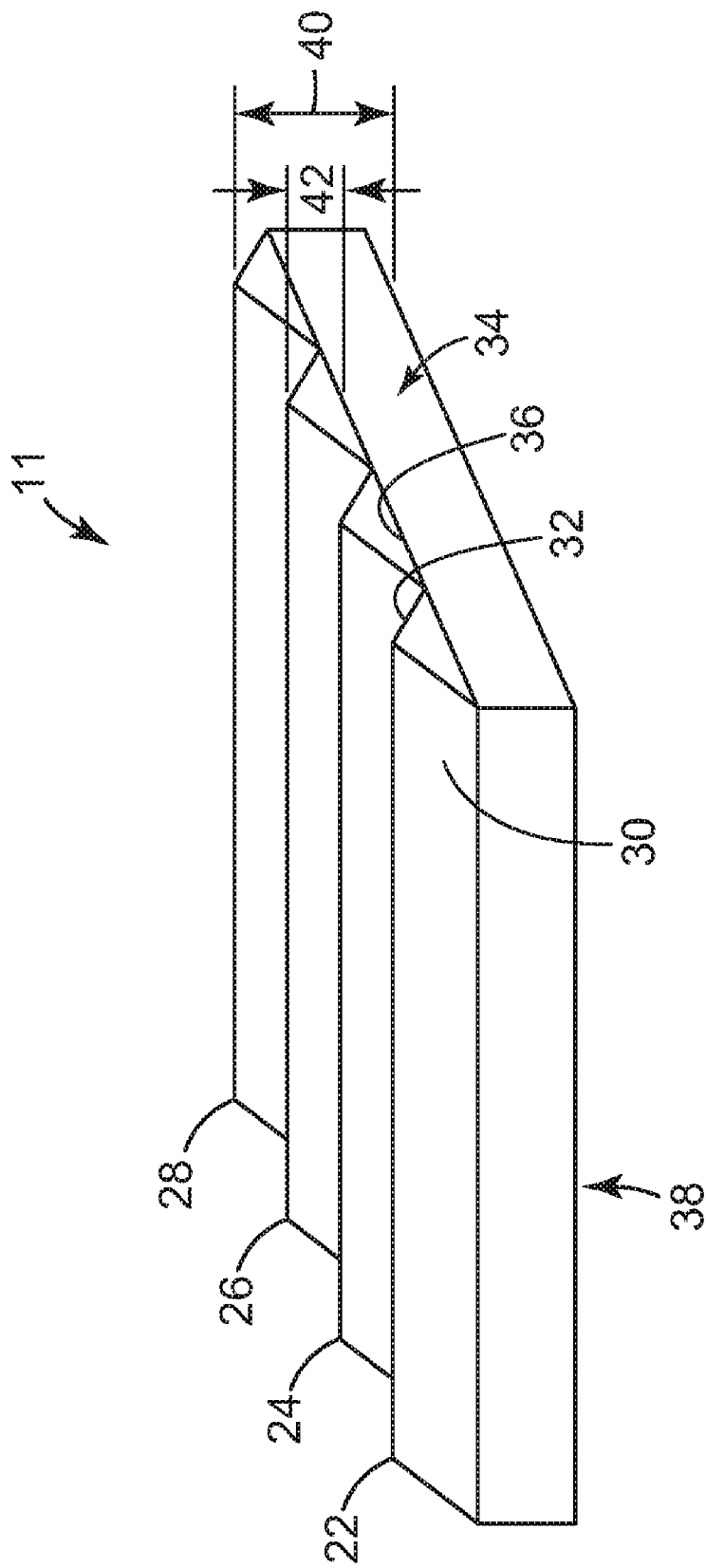
FIG. 2 is a perspective view of an illustrative polymerized structure bearing a micro-structured surface of the present invention.

The brightness enhancing film 11 includes an array of prisms typified by prisms 22, 24, 26, and 28, as illustrated in FIG. 2. Each prism, for example, such as prism 22, has a first facet 30 and a second facet 32. The prisms 22, 24, 26, and 28 can be formed on a body portion 34 that has a first surface 36 on which the prisms are formed and a second surface 38 that is substantially flat or planar and opposite the first surface.

A linear array of regular right prisms can provide both optical performance and ease of manufacture. By right prisms, it is meant that the apex angle $\theta$ is approximately 90°, but can also range from approximately 70° to 120° or from approximately 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. The angle that the facets can form with the surface 38 if the facets were to be projected can be 45°. However, this angle would vary depending on the pitch of the facet or the angle $\theta$ of the apex.

FIGS. 3-9 illustrate representative embodiments of a construction for an optical element in accordance with principles of the present invention. It should be noted that these drawings are not to scale and that, in particular, the size of the structured surface is greatly exaggerated for illustrative purposes. The construction of the optical element can include combinations or two or more of the described embodiments below.

Figure 3:
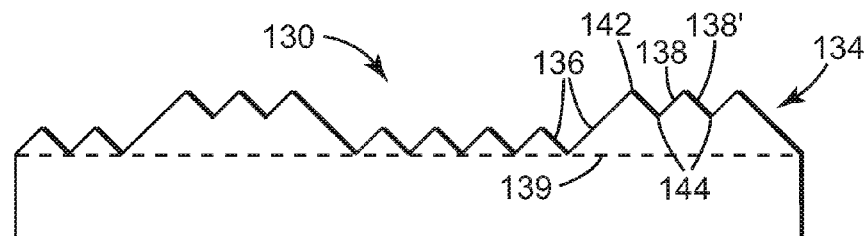
FIG. 3 is a cross-sectional view of an illustrative microstructured article in accordance with the present invention which has prism elements of varying height.

Referring to FIG. 3, there is illustrated a representative cross-section of a portion of one embodiment of an optical element or light directing film in accordance with the present invention. The film 130 includes a first surface 132 and an opposing structured surface 134 which includes a plurality of substantially linearly extending prism elements 136. Each prism element 136 has a first side surface 138 and a second side surface 138', the top edges of which intersect to define the peak, or apex 142 of the prism element 136. The bottom edges of side surfaces 138, 138' of adjacent prism elements 136 intersect to form a linearly extending groove 144 between prism elements. In the embodiment illustrated in FIG. 3, the dihedral angle defined by the prism apex 142 measures approximately 90 degrees, however it will be appreciated that the exact measure of the dihedral angle in this and other embodiments may be varied in accordance with desired optical parameters.

The structured surface 134 of film 130 may be described as having a plurality of alternating zones of prism elements having peaks which are spaced at different distances from a common reference plane. The common reference plane may be arbitrarily selected. One convenient example of a common reference plane is the plane which contains first surface 132; another is the plane defined by the bottom of the lower most grooves of the structured surface, indicated by dashed line 139. In the embodiment illustrated in FIG. 3, the shorter prism elements measure approximately 50 microns in width and approximately 25 microns in height, measured from dashed line 139, while the taller prism elements measure approximately 50 microns in width and approximately 26 microns in height. The width of the zone which includes the taller prism elements can measure between about 1 micron and 300 microns. The width of the zone which includes the shorter prism elements is not critical and can measures between 200 microns and 4000 microns. In any given embodiment the zone of shorter prism elements can be at least as wide as the zone of taller prism elements. It will be appreciated by one of ordinary skill in the art that the article depicted in FIG. 3 is merely exemplary and is not intended to limit the scope of the present invention. For example, the height or width of the prism elements may be changed within practicable limits—it is practicable to machine precise prisms in ranges extending from about 1 micron to about 200 microns. Additionally, the dihedral angles may be changed or the prism axis may be tilted to achieve a desired optical effect.

The width of the first zone can be less than about 200 to 300 microns. Under normal viewing conditions, the human eye has difficulty resolving small variations in the intensity of light which occur in regions less than about 200 to 300 microns in width. Thus, when the width of the first zone is reduced to less than about 200 to 300 microns, any optical coupling which may occur in this zone is not detectable to the human eye under normal viewing conditions.

A variable height structured surface may also be implemented by varying the height of one or more prism elements along its linear extent to create alternating zones which include portions of prism elements having peaks disposed at varying heights above a common reference plane.

Figure 4:
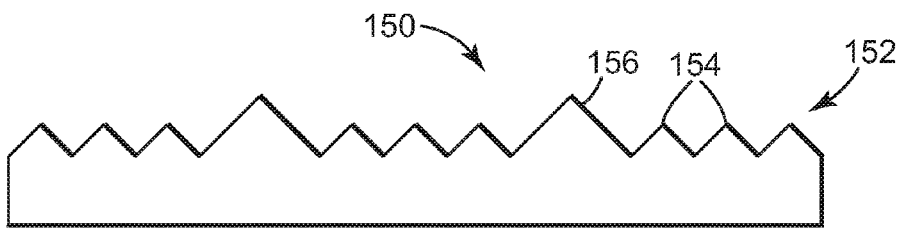
FIG. 4 is a cross-sectional view of an illustrative microstructured article in accordance with the present invention which has prism elements of varying height.

FIG. 4 illustrates another embodiment of the optical element similar to FIG. 3 except that the film 150 includes a structured surface 152 which has a zone of relatively shorter prism elements 154 separated by a zone including a single taller prism element 156. Much like the embodiment depicted in FIG. 3, the taller prism element limits the physical proximity of a second sheet of film to structured surface 152, thereby reducing the likelihood of a visible wet-out condition. It has been determined that the human eye is sensitive to changes in facet heights in light directing films and that relatively wide zones of taller prism elements will appear as visible lines on the surface of a film. While this does not materially affect the optical performance of the film, the lines may be undesirable in certain commercial circumstances. Reducing the width of a zone of taller prism elements correspondingly reduces the ability of a human eye to detect the lines in the film caused by the taller prism elements.

Figure 5:
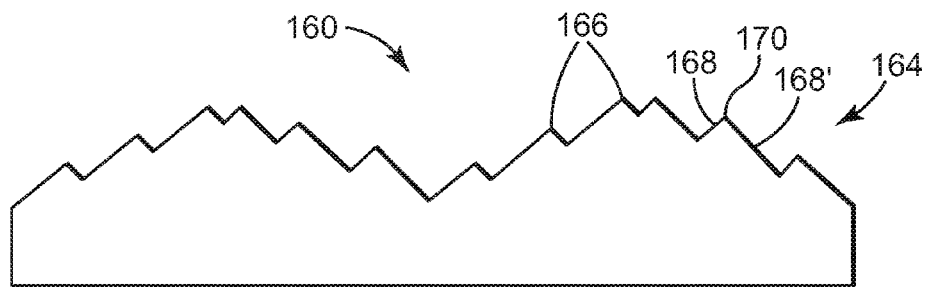
FIG. 5 is a cross-sectional view of an illustrative microstructured article in accordance with the present invention.

FIG. 5 is a representative example of another embodiment of an optical element in which the prism elements are approximately the same size but are arranged in a repeating stair step or ramp pattern. The film 160 depicted in FIG. 5 includes a first surface 162 and an opposing structured surface 164 including a plurality of substantially linear prism elements 166. Each prism element has opposing lateral faces 168, 168' which intersect at their upper edge to define the prism peaks 170. The dihedral angle defined by opposing lateral faces 168, 168' measures approximately 90 degrees. In this embodiment the highest prisms may be considered a first zone and adjacent prisms may be considered a second zone. Again, the first zone can measure less than about 200 to 300 microns.

Figure 6:
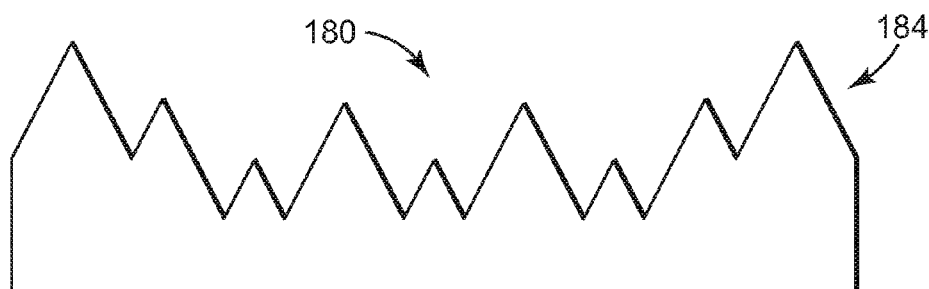
FIG. 6 is a cross-sectional view of an illustrative microstructured article in which the prism elements are of different heights and have their bases in different planes.

FIG. 6 illustrates a further embodiment of an optical element in accordance with the present invention. The film 180 disclosed in FIG. 6 includes a first surface 182 and an opposing structured surface 184. This film may be characterized in that the second zone which includes relatively shorter prism elements contains prism elements of varying height. The structured surface depicted in FIG. 6 has the additional advantage of substantially reducing the visibility to the human eye of lines on the surface of the film caused by the variations in the height of the prism elements.

Figure 7:
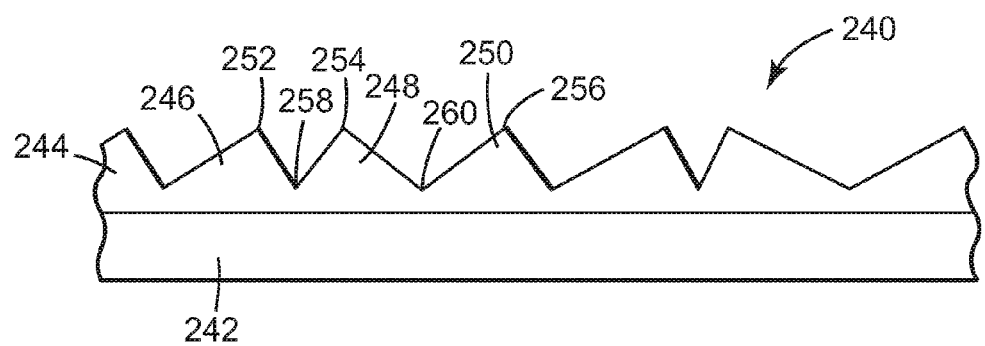
FIG. 7 is a cross-sectional view of an illustrative microstructured article in accordance with the present invention.

FIG. 7 shows another embodiment of an optical element according to the invention for providing a soft cutoff FIG. 7 shows a brightness enhancing film, designated generally as 240, according to the invention. Brightness enhancing film 240 includes a substrate 242 and a structured surface material 244. Substrate 242 is can generally be a polyester material and structured surface material 244 can be an ultraviolet-cured acrylic or other polymeric material discussed herein. The exterior surface of substrate 242 is preferably flat, but could have structures as well. Furthermore, other alternative substrates could be used.

Structured surface material 244 has a plurality of prisms such as prisms 246, 248, and 250, formed thereon. Prisms 246, 248, and 250 have peaks 252, 254, and 256, respectively. All of peaks 252, 254, and 256 have peak or prism angles of preferably 90 degrees, although included angles in the range 60 degrees to 120 degrees. Between prisms 246 and 248 is a valley 258. Between prisms 248 and 250 is a valley 260. Valley 258 may be considered to have the valley associated with prism 246 and has a valley angle of 70 degrees and valley 260 may be considered the valley associated with prism 248 and has a valley angle of 110 degrees, although other values could be used. Effectively, brightness enhancing film 240 increases the apparent on axis brightness of a backlight by reflecting and recycling some of the light and refracting the remainder like prior art brightness enhancing film, but with the prisms canted in alternating directions. The effect of canting the prisms is to increase the size of the output light cone.

Figure 8:
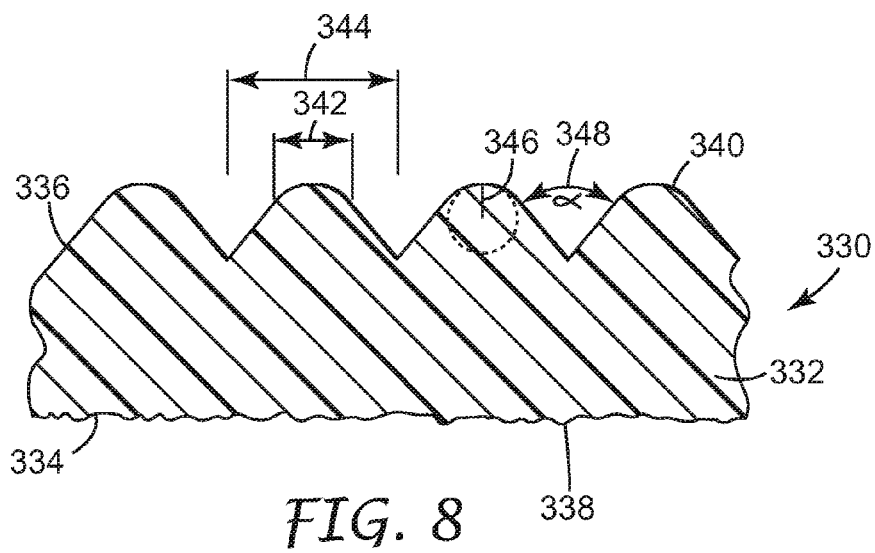
FIG. 8 is a cross-sectional view of an illustrative microstructured article in accordance with the present invention.

FIG. 8 shows another embodiment of an optical element according to the invention having rounded prism apexes. The brightness enhancing article 330 features a flexible, base layer 332 having a pair of opposed surfaces 334, 336, both of which are integrally formed with base layer 332. Surface 334 features a series of protruding light-diffusing elements 338. These elements may be in the form of "bumps" in the surface made of the same material as layer 332. Surface 336 features an array of linear prisms having blunted or rounded peaks 340 integrally formed with base layer 332. These peaks are characterized by a chord width 342, cross-sectional pitch width 344, radius of curvature 346, and root angle 348 in which the chord width is equal to about 20-40% of the cross-sectional pitch width and the radius of curvature is equal to about 20-50% of the cross-sectional pitch width. The root angle ranges from about 70-110 degrees, or from about 85-95 degrees, with root angles of about 90 degrees being preferred. The placement of the prisms within the array is selected to maximize the desired optical performance.

Rounded prism apex brightness enhancing articles usually suffer from decreased gain. However, the addition of high refractive index surface modified colloidal nanoparticles of the invention offsets the lost gain from the rounded prism apex brightness enhancing articles.

Figure 9:
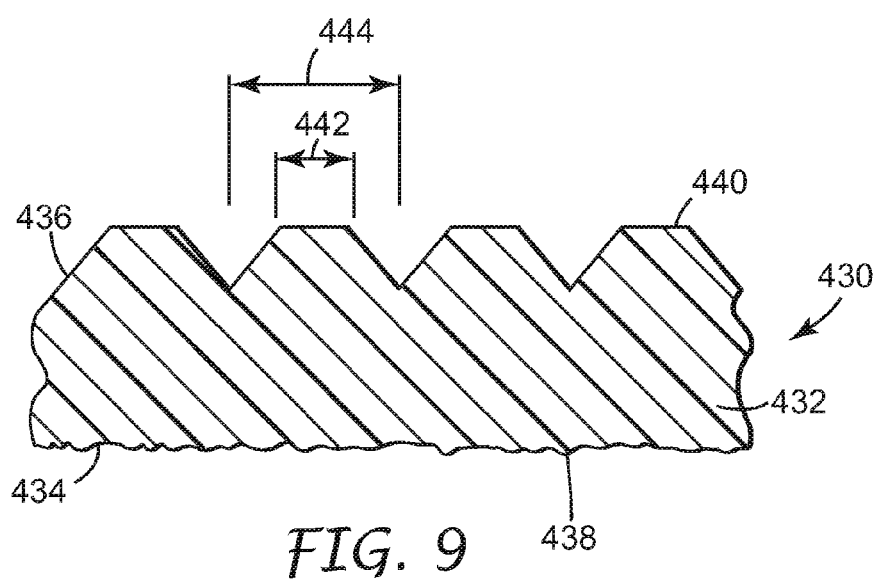
FIG. 9 is a cross-sectional view of an illustrative microstructured article in accordance with the present invention.

FIG. 9 shows another embodiment of an optical element according to the invention having flat or planar prism apexes. The brightness enhancing article 430 features a flexible, base layer 432 having a pair of opposed surfaces 434, 436, both of which are integrally formed with base layer 432. Surface 434 features a series of protruding light-diffusing elements 438. These elements may be in the form of "flat bumps" in the surface made of the same material as layer 432. Surface 436 features an array of linear prisms having flattened or planar peaks 440 integrally formed with base layer 432. These peaks are characterized by a flattened width 442 and cross-sectional pitch width 444, in which the flattened width can be equal to about 0-30% of the cross-sectional pitch width.

Another method of extracting light from a lightguide is by use of frustrated total internal reflection (TIR). In one type of frustrated TIR the lightguide has a wedge shape, and light rays incident on a thick edge of the lightguide are totally internally reflected until achieving critical angle relative to the top and bottom surfaces of the lightguide. These sub-critical angle light rays are then extracted, or more succinctly refract from the lightguide, at a glancing angle to the output surface. To be useful for illuminating a display device, these light rays must then be turned substantially parallel to a viewing, or output, axis of the display device. This turning is usually accomplished using a turning lens or turning film.

Figure 10:
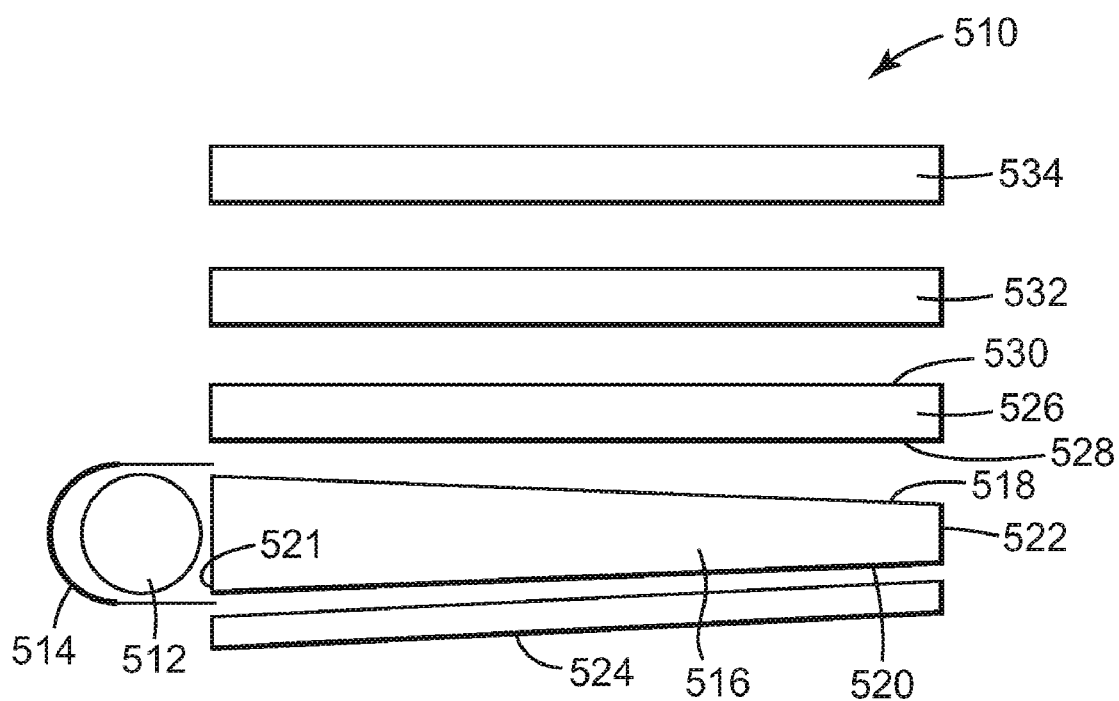
FIG. 10 is a schematic view of an illumination device including a turning film in accordance with the present invention.
Figure 11:
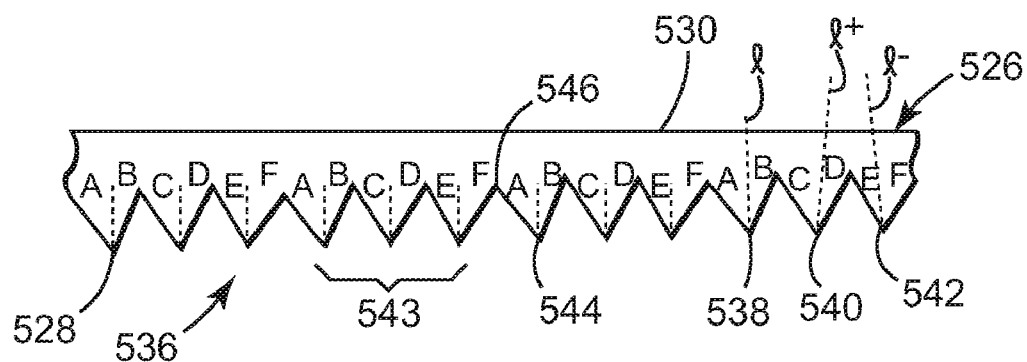
FIG. 11 is a cross-sectional view of a turning film in accordance with the present invention.
Figure 12:
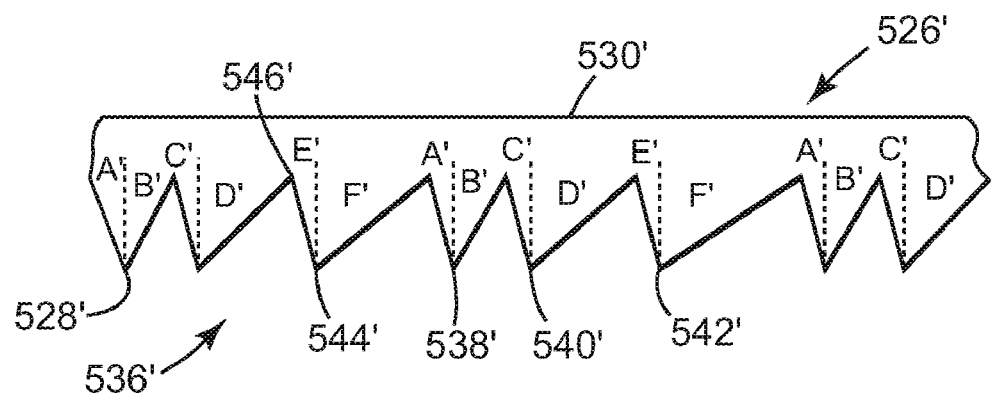
FIG. 12 is a cross-sectional view of a turning film in accordance with the present invention.

FIGS. 10-12 illustrate an illumination device including a turning film. The turning film can include the inventive material disclosed herein for form a durable turning film. A turning lens or turning film typically includes prism structures formed on an input surface, and the input surface is disposed adjacent the lightguide. The light rays exiting the lightguide at the glancing angle, usually less than 30 degrees to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display.

Referring to FIG. 10, an illumination system 510 includes optically coupled a light source 512; a light source reflector 514; a lightguide 516 with an output surface 518, a back surface 520, an input surface 521 and an end surface 522; a reflector 524 adjacent the back surface 520; a first light redirecting element 526 with an input surface 528 and an output surface 530; a second light redirecting element 532; and a reflective polarizer 534. The lightguide 516 may be a wedge or a modification thereof. As is well known, the purpose of the lightguide is to provide for the uniform distribution of light from the light source 512 over an area much larger than the light source 512, and more particularly, substantially over an entire area formed by output surface 518. The lightguide 516 further preferably accomplishes these tasks in a compact, thin package.

The light source 512 may be a CCFL that is edge coupled to the input surface 521 of the lightguide 516, and the lamp reflector 514 may be a reflective film that wraps around the light source 512 forming a lamp cavity. The reflector 524 backs the lightguide 516 and may be an efficient back reflector, e.g., a lambertian or a specular film or a combination.

The edge-coupled light propagates from the input surface 521 toward the end surface 522, confined by TIR. The light is extracted from the lightguide 516 by frustration of the TIR. A ray confined within the lightguide 516 increases its angle of incidence relative to the plane of the top and bottom walls, due to the wedge angle, with each TIR bounce. Thus, the light eventually refracts out of each of the output surface 518 and the back surface 520 because it is no longer contained by TIR. The light refracting out of the back surface 520 is either specularly or diffusely reflected by the reflector 524 back toward and largely through the lightguide 516. The first light redirecting element 526 is arranged to redirect the light rays exiting the output surface 518 along a direction substantially parallel to a preferred viewing direction. The preferred viewing direction may be normal to the output surface 518, but will more typically be at some angle to the output surface 518.

As shown in FIG. 11, the first light redirecting element 526 is a light transmissive optical film where the output surface 530 is substantially planar and the input surface 528 is formed with an array 536 of prisms 538, 540 and 542. The second light redirecting element 532 may also be a light transmissive film, for example a brightness enhancing film such as the 3M Brightness Enhancement Film product (sold as BEFIII) available from Minnesota Mining and Manufacturing Company, St. Paul, Minn. The reflective polarizer 534 may be an inorganic, polymeric, cholesteric liquid crystal reflective polarizer or film. A suitable film is the 3M Diffuse Reflective Polarizer film product (sold as DRPF) or the Specular Reflective Polarizer film product (sold as DBEF), both of which are available from Minnesota Mining and Manufacturing Company.

Within array 536, each prism 538, 540 and 542 may be formed with differing side angles as compared to its respective neighbor prisms. That is, prism 540 may be formed with different side angles (angles C and D) than prism 538 (angles A and B), and prism 542 (angles E and F). As shown, prisms 538 have a prism angle, i.e., the included angle, equal to the sum of the angles A and B. Similarly, prisms 540 have a prism angle equal to the sum of the angles C and D, while prisms 542 have a prism angle equal to the sum of the angles E and F. While array 536 is shown to include three different prism structures based upon different prism angle, it should be appreciated that virtually any number of different prisms may be used.

Prisms 538, 540 and 542 may also be formed with a common prism angle but with a varied prism orientation. A prism axis "l" is illustrated in FIG. 11 for prism 538. The prism axis l may be arranged normal to the output surface 530, as shown for prism 538, or at an angle to the output surface either toward or away from the light source as illustrated by phantom axes "l+" and "l-", respectively, for prisms 540 and 542.

Prisms 538, 540 and 542 may be arranged within array 536 as shown in FIG. 11 in a regular repeating pattern or clusters 543 of prisms, and while the array 536 is not shown to have like prisms adjacent like prisms, such a configuration may also be used. Moreover, within the array 536, the prisms 538, 540 and 542 may change continuously from a first prism configuration, such as prism configuration 538, to a second prism configuration, such as prism configuration 540, and so on. For example, the prism configuration may change in a gradient manner from the first prism configuration to the second prism configuration. Alternatively, the prisms may change in a step-wise manner, similar to the configuration shown in FIG. 11. Within each cluster 543, the prisms have a prism pitch, which is selected to be smaller than the spatial ripple frequency. Likewise, the clusters may have a regular cluster pitch. The prism array can be symmetrical as shown in FIG. 11 or the prism array can be non-symmetrical.

While the array 536 shown in FIG. 11 has prisms having a symmetric configuration, an array of prisms, such as array 536' shown in FIG. 12 formed in light redirecting element 526', may be used. Referring then to FIG. 12, in the array 536', prisms 538', for example, has angle A' unequal to angle B'. Similarly for prisms 540' and 542', angle C' is unequal to angle A' and angle D', and angle E' is unequal to either of angle A', angle C' or angle F'. The array 536' may be advantageously formed using a single diamond cutting tool of a predetermined angle, and tilting the tool for each cut producing prisms of differing prism angle and symmetry. However, it will be appreciated that with the use of a single cutting tool, the prism angles will be the same, i.e., A+B=C+D=E+F.

It is contemplated that as few as two different prism configurations may be used and arranged in clusters within the array 536, although as many prism sizes as necessary to accomplish a modification of the output profile from the lightguide 516 may be used. One purpose of the prism side angle variation is to spread and add variable amounts of optical power into the first light redirecting element 526. The varying configuration of prisms 538, 540 and 542 serves to provide substantially uniform sampling of the input aperture of the lightguide, which minimizes non-uniformities in the light extracted from the lightguide 516. The net result is an effective minimization of the ripple effect particularly near the entrance end 521 of the lightguide 516.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Preparation of the Optical Element

Compositions used in the preparation of exemplary optical elements of the present invention are described in the examples set forth below. Pertinent physical properties of the optical elements are described in the tables set forth below. The preparation of exemplary optical elements containing prismatic microstructures was similar to those described in U.S. Pat. Nos. 5,175,030, 5,183,597 and 7,041,365.

Unless otherwise specified, micro-prismatic structures have a 90° apex angle as defined by the slope of the sides of the prisms with the mean distance between adjacent apices being about 50 micrometers. The prism vertices are described as "sharp" (i.e., angular apex), "round" (apex has a radius), or "flat" (i.e., prism is truncated).

All proportions shown in the examples are percent by weight unless otherwise specified.

Scratch Test Method

Scratch testing on the samples formed, described below, was performed using the following method. An optical film sample, an exemplary optical element of the present invention, 14 cm×17.8 cm (5.5 in×7 in), was affixed to a flat glass plate using adhesive tape on the 14 cm sides. For samples with microstructured grooves, the grooves were aligned parallel to the 17.8 cm side of the film sample. Using a stylus-type scratch test machine, the force on the stylus was adjusted to create a scratch on the surface of the sample approximately 30 to 200 micrometers wide. Choice of test variables such as stylus tip geometry or hardness, force applied to the stylus and stylus travel speed will depend on properties of the sample to be tested and desired range of resultant values. Suitable scratch test machines include Taber Linear Abrader Tester Model 5700 (Taber Industries, North Tonawanda, N.Y.), K9300 Scratch Tester (Koehler Industries Co., Bohemia, N.Y.), and Micro Scratch Tester (Micro Photonics, Inc., Irvine, Calif.). In general, pointed styli create more reproducible and readable scratches than round-tipped styli.

For the samples described below, force applied to the stylus was generally in the range of 8,000-40,000 $g/cm^2$. Scratches of sufficient length to permit six separate width measurements were created in two separate areas of the sample. Scratch direction was orthogonal to the parallel ridges on the microstructured film sample. Scratch width was measured by means of an optical microscope such as an Olympus Microscope Model BX51 at 20× magnification. For each scratch, six individual measurements of the scratch width were made along the length of the scratch. The six width measurements thus obtained were averaged for each scratch line created. The average measurements taken from the two separate areas were then averaged to give an overall scratch width average for each sample.

The lower limit of measurement of a scratch width is about 30 micrometers by the above method. Results of this method for each example formed below are reported in the RESULTS section below. Because of variability inherent in the scratch test method, results may vary from test to test. It is recommended that a known control material is used as a standard. Performance of the sample material may then be compared to that of the control.

Gain Test Method

Gain, the difference in transmitted light intensity of an optical material compared to a standard material, was measured on a SpectraScan™ PR-650 SpectraColorimeter available from Photo Research, Inc, Chatsworth, Calif. Results of this method for each example formed below are reported in the RESULTS section below. Film samples are cut and placed on a Teflon light cube which is illuminated via a light-pipe using a Foster DCR II light source.

Measurement of Refractive Index

Unless otherwise specified, all measurements of refractive index were conducted on an Abbe Refractometer generally in accord with the manufacturer's recommendations and good laboratory practices. Results of this method for each example formed below are reported in the RESULTS section below.

Determination of Metal Oxide Content

Metal oxide content, i.e., particle loading, of modified oxide dispersions and oxide-containing resin dispersions was determined by thermal gravimetric analysis (TGA). Results of this method for each example formed below are reported in the RESULTS section below.

LIST OF MATERIALS USED IN THE
EXAMPLES BELOW

| MATERIAL | SOURCE | DESCRIPTION |
|---|---|---|
| 1-Methoxy-2-propanol | Commodity | Solvent |
| 2-[2-(2-methoxyethoxy) ethoxy]acetic acid (MEEAA) | Sigma-Aldrich Milwaukee, WI | Aldrich catalog #40, 700-3 |
| (Silane A174) 3-(trimethoxysilylpropyl) methacrylate | Sigma-Aldrich Milwaukee, WI | Aldrich catalog #44015-9 Silane surface modifier |
| CN 120 | Sartomer Co. Exton, PA | Bisphenol-A epoxy diacrylate oligomer |
| Darocur 1173 | Ciba Specialty Chemical, Inc. Tarrytown, NY | Photoinitiator |
| Methacrylic acid | Sigma-Aldrich Milwaukee, WI | |
| Nalco 2327 | Ondeo-Nalco Co. | Colloidal silica dispersion |

-continued

| MATERIAL | SOURCE | DESCRIPTION |
| --- | --- | --- |
| Nalco OOSSOO8 | Naperville, IL Ondeo-Nalco Co. Naperville, IL | Colloidal zirconia dispersion |
| SR 295 | Sartomer Co. Exton, PA | Pentaerythritol tetraacrylate monomer |
| SR 339 | Sartomer Co. Exton, PA | 2-Phenoxyethyl acrylate monomer |
| Prostab 5128 | Ciba Specialty Chemical, Inc. Tarrytown, NY | Hindered amine nitroxide inhibitor |
| Silquest A1230 | OSI Specialties-Crompton South Charleston, WV | Silane surface modifier |
| TPO | BASF Corp. Mount Olive, NJ | Photoinitiator |
| Optical Resin C | | 48 parts Sartomer SR 295 (by weight) 35 parts Sartomer CN 120 (by weight) 17 parts Sartomer SR 339 (by weight) |

Preparation of Silane-Modified PEG

"PEG2TES" refers to N-(3-triethoxysilylpropyl)methoxyethoxyethyl carbamate. It was prepared as follows: A 250 ml round-bottomed flask equipped with a magnetic stir bar was charged with 35 g diethylene glycol methyl ether and 77 g methyl ethyl ketone followed by rotary evaporation of a substantial portion of the solvent mix to remove water. 3-(Triethoxysilyl)propylisocyanate (68.60 g) was charged to the flask. Dibutyltin dilaurate (approx. 3 mg) was added and the mixture stirred. The reaction proceeded with a mild exotherm. The reaction was run for approximately 16 hr at which time infrared spectroscopy showed no isocyanate. The remainder of the solvent and alcohol were removed via rotary evaporation at 90° C. to yield 104.46 g PEG2TES as a somewhat viscous fluid.

Example 1A

Silane-Modified Silica Nanoparticle Dispersion

Preparation of silane-modified silica nanoparticle dispersion: Nalco 2327 (400.01 g) was charged to a 1 liter (32 oz) jar. 1-Methoxy-2-propanol (450.05 g), Silane A174 (19.02 g), PEG2TES (9.45 g), and 2% Prostab 5128 in $H_2O$ (0.5 g) were mixed together and added to the colloidal dispersion while stirring. The jar was sealed and heated to 80° C. for 16.5 hr resulting in a clear, low viscosity dispersion of surface modified colloidal silica nanoparticles.

Example 1B

Silane-Modified Silica Resin Dispersion

Preparation of silane-modified silica nanoparticle resin dispersion: Into a 1 liter round-bottom flask, 876.4 g of this modified silica dispersion (from Example 1A) was charged followed by 245.83 g Optical Resin C, and 4.9 g of a 2% solution of Prostab 5128 in water. Water and alcohol were removed by rotary evaporation at 80° C. thereby yielding a clear, low viscosity liquid resin composition containing approximately 38.5% SiO2.

A total of ten batches were made and combined to yield 3,864.9 g of silane-modified colloidal silica nanoparticle resin. To this was added 38.6 g Darocur 1173. The resultant surface-modified colloidal silica nanoparticle containing resin contained 37.33% SiO2. The refractive index was 1.50.

Example 2

Silane-Modified Silica Resin Dispersion

Nalco 2327 (1200.00 g) was charged to a 2 liter Erlenmeyer flask. 1-Methoxy-2-propanol (1350.3 g), Silane A174 (57.09 g), and PEG2TES (28.19 g) were mixed together and added to the colloidal dispersion while stirring. The contents of the flask were poured into 3 32 oz sealed jars. The jars were heated at 80° C. for 16 hours. This resulted in a clear, low viscosity dispersion of surface modified colloidal silica nanoparticles.

A 10 liter round-bottom flask (large neck) was charged with the contents of the three jars (2638 g), 743.00 g Optical Resin C, and 8.0 g Prostab 5128 at 2% in water. Water and alcohol were removed via rotary evaporation. A clear, low viscosity resin dispersion containing surface modified colloidal silica nanoparticles was thus obtained. The resin dispersion contained approximately 38.5% SiO2 and approximately 2% 1-methoxy-2-propanol as measured by gas chromatography.

Example 2A

One percent by weight of Darocur 1173 was added to the resin dispersion of Example 2

Example 2B

The surface-modified colloidal nanoparticle dispersion of Example 2 was diluted with Optical Resin C to obtain a 28% dispersion. Darocur 1173 was then added at 1% by weight.

Example 2C

The surface-modified colloidal nanoparticle dispersion of Example 2 was diluted with Optical Resin C to obtain an 18% dispersion. Darocur 1173 was then added at 1% by weight.

Example 3

Silane-Modified MEEAA-Modified Zirconia Resin Dispersion

A flask was charged with 400.11 grams Nalco OOSSOO8 zirconia sol and 32.84 grams MEEAA thus providing a surface coverage of 1.0 mmol MEEAA per gram of zirconia. This mixture was rotary evaporated to dryness and dried further in a vacuum oven at 90° C. to remove excess acetic acid. The powder thus obtained was redispersed in deionized water to give 30 weight percent MEEAA surface-modified colloidal zirconia nanoparticles. A jar was charged with 150 grams of the zirconia nanoparticle dispersion, and 11.41 grams Silane A174 dispersed in 150 grams of 1-methoxy-2-propanol was added slowly with stirring thus providing surface coverage at 1.0 mmol silane per gram of zirconia. The mixture was heated at 90° C. for 2 hours.

A flask was charged with 152.43 grams of the silane-modified zirconia nanoparticle dispersion, 30.54 grams Optical Resin C, and 0.47 gram Prostab 5128 at 10% in water. The mixture was rotary evaporated at 80° C. until no solvent was being removed (approximately 30 minutes). The surface-modified colloidal zirconia nanoparticle resin dispersion thus obtained had a refractive index of 1.572.

Example 4

Silane Modified Zirconia Dispersion

Preparation of silane-modified zirconia nanoparticle dispersion: Nalco OOSSOO8 zirconia sol (456.02 g) and 41.18 g MEEAA were charged to a 1 liter round bottom flask. The water and acetic acid were removed via rotary evaporation at 80° C. The powder thus obtained was redispersed in 285 g D.I water and charged to a 2 liter beaker to which was added with stirring 625 g 1-methoxy-2-propanol, 63.11 g Silane A-174 and 42.31 g Silquest A-1230. This mixture was stirred 30 min at room temperature then poured into 1 liter (quart) jars, sealed and heated to 90° C. for 4.5 h. The contents of the jars were removed and concentrated via rotary evaporation to 570 g. Deionized water (1850 g) and 61.3 g concentrated aqueous ammonia (29% NH3) were charged to a 4 liter beaker. The concentrated dispersion was added slowly to the beaker with stirring. The white precipitate thus obtained was isolated via vacuum filtration and washed with additional D.I. water. The damp solids were dispersed in 540 g 1-methoxy-2-propanol. The resultant silane modified zirconia dispersion contained 15.58% $ZrO_2$.

Preparation of silane-modified zirconia nanoparticle resin dispersion: A 1 liter round-bottom flask was charged with 429.6 g of this modified zirconia dispersion, 81.8 g Optical Resin C, and 1.6 g Prostab 5128 at 2 wt % in water. Water and alcohol were removed via rotary evaporation. A slightly hazy low viscosity liquid was obtained. The resultant silane-modified zirconia resin dispersion contained 38.52% ZrO2 and had a refractive index of 1.57. Darocur 1173 (0.93 g) was added to the formulation.

Example 5

Mixed Modified Silica/Modified Zirconia Resin

A 1 liter round-bottom flask was charged with 250 g of the modified zirconia dispersion of Example 6, 106.72 g of the modified silica dispersion of Example 2, 50.00 g Optical Resin C, and 1.0 g Prostab 5128 at 2% in water. Water and alcohol were removed via rotary evaporation. A slightly hazy low viscosity liquid was obtained. The resin dispersion thus obtained contained approximately 31.4% $ZrO_2$, 16.1% $SiO_2$ and 46.28% total inorganic material. The dispersion had a refractive index of 1.55. Darocur 1173 (0.54 g) was added to the formulation.

Example 6

Silane-Modified Zirconia/Titania Resin Dispersion

A flask was charged with 200.43 grams of Optolake 3 zirconia coated titania sol (Catalysts & Chemical Industries Corp., Kawasaki, Japan) and 6.05 grams of A1230 to give a surface coverage of 0.6 mmol/gram. This was heated overnight at 90° C. A mixture of 200.24 grams of 1-methoxy-2-propanol and Silane A174 were added slowly with mixing to the treated zirconia/titania dispersion to give a surface coverage of 0.6 mmol/gram. The resultant dispersion was heated overnight at 80° C. This was reduced on a rotary evaporator by 266.13 grams and then diluted with 113.46 grams 1-methoxy-2-propanol. This was reduced a second time on a rotary evaporator by 121.54 grams and then diluted with 121.23 grams 1-methoxy-2-propanol. This was finally reduced a third time by 94.04 grams on a rotary evaporator. The resulting silane-treated zirconia/titania dispersion was filtered through a 1 micron glass fiber syringe filter.

A flask was charged with 144.58 grams this mixture and combined with 35.96 grams of Optical Resin C and 0.20 gram Prostab 5128 at 10% in water. The mixture was rotary evaporated at 80° C. until no solvent was being removed (approximately 30 minutes) thus providing a silane-treated zirconia/titania resin dispersion with a refractive index of 1.576.

Example 7

MEEAA-Modified Zirconia Resin Dispersion

A flask was charged with 702.16 grams of Nalco OOS-SOO8 zirconia sol and 28.68 grams of MEEAA to give a surface coverage of 1.0 mmol/gram. This was rotary evaporated to dryness and dried further in a vacuum oven at 90° C. to remove excess acetic acid. The powder was redispersed in deionized water to provide a 23 weight percent dispersion of MEEAA-treated zirconia. This was again rotary evaporated to dryness and dried further in a vacuum oven at 85° C. to remove excess acetic acid. The powder was redispersed in deionized water to give 23 weight percent zirconia. This solution was sonicated with a sonic horn for 44 minutes and then filtered through a 1 micron glass fiber sysringe filter.

A flask was charged with 326.19 grams of the MEEAA-treated zirconia dispersion, 321.52 grams of 1-methoxy-2-propanol, 90.11 grams of Optical Resin C and 0.34 gram Prostab 5128 at 10% in water. The mixture was rotary evaporated at 80° C. until no solvent was being removed (approximately 30 minutes). This gave a resin with a refractive index of 1.569.

Example 8

MEEAA-Modified Zirconia Resin Dispersion

A flask was charged with 702.16 grams of Nalco OOS-SOO8 zirconia sol and 28.68 grams of MEEAA to give a surface coverage of 1.0 mmol/gram. The mixture was rotary evaporated to dryness and dried further in a vacuum oven at 90° C. to remove excess acetic acid. The powder thus obtained was redispersed in deionized water to provide a 23 weight percent nanocolloidal dispersion of MEEAA-treated zirconia. This was again rotary evaporated to dryness and dried further in a vacuum oven at 85° C. to remove excess acetic acid. The powder was redispersed in deionized water to give 23 weight percent zirconia. This solution was sonicated with a sonic horn for 44 minutes and then filtered through a 1 micron glass fiber syringe filter.

A flask was charged with 349.91 grams of the MEEAA-treated zirconia dispersion, 4.63 grams of acrylic acid (yielding a surface coverage of 1.0 mmol/gram), 340.55 grams of 1-methoxy-2-propanol, 97.12 grams of Optical Resin C and 0.41 gram Prostab 5128 at 10% in water. The mixture was rotary evaporated at 80° C. until no solvent was being removed (approximately 30 minutes). This gave a MEEAA surface modified zirconia nanoparticle resin dispersion with a refractive index of 1.548.

Example 9

Silane-Modified Zirconia Resin Dispersion

A flask was charged with 352.67 grams of Nalco OOS-SOO8 zirconia sol and 23.99 grams of A1230 to give a surface coverage of 0.6 mmol/gram. The mixture was heated for 1 hour at 90° C. To this was added slowly using a separatory funnel, a mixture of 36.57 grams of A174 dispersed in 350.72 grams of 1-methoxy-2-propanol to give 1.8 mmol/gram surface coverage. The mixture was heated at 90° C. for 4 hours. The solution was reduced by 422.66 grams on a rotary evaporator. The solution was combined with an ammonia water solution to flocculate the zirconia in a final pH>9 solution (700 grams deionized water mixed with 80 grams of 30 percent ammonium hydroxide. The slurry was filtered on a 185 mm Whatman #4 filter paper and the precipitate was washed with 350 grams deionized water. The precipitate was dispersed into 1-methoxy-2-propanol to give 23 weight percent zirconia. This solution was sonicated with a sonic horn for 44 minutes and then filtered through a 1 micron glass fiber syringe filter.

A flask was charged with 331.80 grams this sol and combined with 46.51 grams of Optical Resin C and 0.46 gram Prostab 5128 at 10% in water. The mixture was rotary evaporated at 80° C. until no solvent was being removed (approximately 30 minutes). This gave a resin with a refractive index of 1.541.

Example 10

Phenyl/Isooctyl/Methacrylate Silane Modified Silica Dispersion

Nalco 2327 (199.9 g) was charged to a 16 oz jar. 1-Methoxy-2-propanol (400.02 g), 3-(trimethoxysilylpropyl) methacrylate (0.28 g), isooctyl trimethoxy-silane (0.59 g) and phenyltrimethoxysilane (9.44 g) were mixed together and added to the colloidal dispersion while stirring. The jar was sealed and heated to 90° C. for 22 hr. This resulted in a hazy, high viscosity solution of modified silica.

A 1 liter round-bottom flask (large neck) was charged with the above modified sol (405.4 g), OPTICAL RESIN C (82 g), and 2 wt % hindered amine nitroxide in water (1.64 g). Water and alcohol were removed via rotary evaporation. A clear high viscosity liquid was obtained. The solution contained approximately 38.5 wt % SiO2. Darocur 1173 (1.3 g) was added.

COMPARATIVE EXAMPLES

The following comparative examples were formed using similar resin systems and micro-structured topography and processes for forming the same as the examples above. However, the comparative examples do not include surface modified colloidal nanoparticles.

Comparative Example A

Vikuiti™ BEF II 90/50 film (BEF II), sold by 3M, St Paul, Minn., is a microreplicated prismatic structured brightness enhancing film having a prism angle of 90 degree and a pitch (distance between prism peaks) of 50 micrometers. The prism peaks in Comparative Example A are sharp.

Comparative Example B

Vikuiti™ Rounded Brightness Enhancement Film (RBEF) film, sold by 3M, St Paul, Minn., is a microreplicated prismatic structured brightness enhancing film having a prism angle of 90 degree and a pitch of 50 micrometers. The prism peaks in Comparative Example B are rounded and have a peak radius of 8 microns.

Comparative Example C

Darocur 1173 was added to Optical Resin C at 1% by weight and the resultant composition was cured against a microstructured tool surface as described in the references. Prism peaks of Comparative Example C can be sharp, rounded or flat depending on the structure of the tool used during the cure of the resin.

RESULTS

TABLE 1

COMPOSITION SUMMARY

| Example | Metal Oxide | Modifier | Particle Loading (%) | Uncured Refr. Index |
|---|---|---|---|---|
| COMP EX A | None | None | 0 | |
| COMP EX B | None | None | 0 | |
| COMP EX C | None | None | 0 | |
| 1B | SiO$_2$ | A174 PEG2TES | 37 | 1.50 |
| 2A | SiO$_2$ | A174 PEG2TES | 38 | 1.497 |
| 2B | SiO$_2$ | A174 PEG2TES | 28 | 1.503 |
| 2C | SiO$_2$ | A174 PEG2TES | 18 | 1.507 |
| 3 | ZrO$_2$ | MEEAA A174 | 39 | 1.572 |
| 4 | ZrO$_2$ | A174 A1230 | 38 | 1.57 |
| 5 | SiO$_2$ ZrO$_2$ | See example | 46 | 1.55 |
| 6 | ZrO$_2$/TiO$_2$ | A1230 A174 | 32 | 1.576 |
| 7 | ZrO$_2$ | MEEAA | 35 | 1.569 |
| 8 | ZrO$_2$ | MEEAA | 33 | 1.548 |
| 9 | ZrO$_2$ | A1230 A174 | 33* | 1.541 |
| 10 | SiO$_2$ | Phenyl/isooctyl A174 | 38 | |

*Estimated value

TABLE 2

GAIN TABLE

| EXAMPLE | Peak Type | Peak Radius (micron) | Ave Gain |
|---|---|---|---|
| Comp Ex A | Sharp | 0 | 1.716 |
| Comp Ex C | Sharp | 0 | 1.627 |
| 2A | Sharp | 0 | 1.594 |
| 2B | Sharp | 0 | 1.608 |
| 2C | Sharp | 0 | 1.620 |
| 4 | Sharp | 0 | 1.699 |
| 5 | Sharp | 0 | 1.632 |

Table 2 illustrates particle loading, particle type, and resin type and their respective relationships to gain. In general, gain is a function of index of refraction within the range of materials tested. That is, higher index of refraction results in higher gain.

TABLE 3

GAIN TABLE

| EXAMPLE | Peak Type | Peak Radius (micron) | Ave Gain |
|---|---|---|---|
| Comp Ex C | Round | 2 | 1.632 |
| 2A | Round | 2 | 1.590 |
| 2B | Round | 2 | 1.604 |
| 2C | Round | 2 | 1.611 |
| 4 | Round | 2 | 1.665 |
| 5 | Round | 2 | 1.603 |
| Comp Ex C | Round | 4 | 1.625 |
| 2A | Round | 4 | 1.579 |
| 2B | Round | 4 | 1.591 |
| 2C | Round | 4 | 1.603 |
| 4 | Round | 3 | 1.640 |
| 5 | Round | 3 | 1.584 |
| Comp Ex C | Round | 10.5 | 1.504 |
| 2A | Round | 10.5 | 1.474 |
| 2B | Round | 10.5 | 1.484 |
| 2C | Round | 10.5 | 1.490 |
| 4 | Round | 6.6 | 1.587 |
| 5 | Round | 6.6 | 1.550 |

TABLE 4

GAIN TABLE

| EXAMPLE | Peak Type | Peak Width (micron) | Ave Gain |
|---|---|---|---|
| Comp Ex C | Flat | 2 | 1.623 |
| 2A | Flat | 2 | 1.577 |
| 2B | Flat | 2 | 1.587 |
| 2C | Flat | 2 | 1.600 |
| Comp Ex C | Flat | 4 | 1.593 |
| 2A | Flat | 4 | 1.550 |
| 2B | Flat | 4 | 1.563 |
| 2C | Flat | 4 | 1.572 |

Tables 3 and 4 illustrates particle loading, particle type, resin type, peak type, peak radius or peak width and their respective relationships to gain. In general, gain is a function of index of refraction within the range of materials tested. That is, higher index of refraction results in higher gain. Additionally, sharp-tip prisms result in maximum gain for a given composition, and usually, smaller peak radii result in higher gain when compared to larger peak radii for round prism apexes. Also, flat or truncated prismatic apexes result in decreased gain when compared to similar round geometries of the same composition.

TABLE 5a

SCRATCH TESTING

| Example | Peak Radius (micron) | Ave Scratch Width (micron) |
|---|---|---|
| COMP EX A | 0 | 148 |
| COMP EX C | 0 | 129 |
| 2A | 0 | 121 |
| 2B | 0 | 124 |
| 2C | 0 | 120 |

Table 5a illustrates the difference in scratch resistance for different compositions. In general, larger scratch width implies lower scratch resistance. Addition of inorganic oxide particles to the resin system increases the scratch resistance of the cured composition. Also, COMP EX C shows that the OPTICAL RESIN C is more scratch resistant than the resin of example COMP EX A.

TABLE 5b

SCRATCH TESTING

| Example | Peak Radius (micron) | Ave Scratch Width (micron) |
|---|---|---|
| SHARP | | |
| COMP EX A | 0 | 94 |
| 1B | 0 | 78 |
| 4 | 0 | 88 |
| 5 | 0 | 80 |
| 6 | 0 | 90 |
| 7 | 0 | 88 |
| 8 | 0 | 90 |
| 9 | 0 | 88 |

Table 5b illustrates the difference in scratch resistance for different compositions. In general, larger scratch width implies lower scratch resistance. Addition of inorganic oxide particles to the resin system increases the scratch resistance of the cured composition. In general, a higher volume loading of inorganic oxide particles decreases the average scratch width.

TABLE 6

SCRATCH TESTING

| Example | Peak Radius (micron) | Ave Scratch Width (micron) |
|---|---|---|
| ROUND | | |
| 2B | 2 | 112 |
| 2B | 10.5 | <30 |
| 2C | 2 | 107 |
| 2C | 10.5 | <30 |
| COMP EX B | 8.0 | 132 |
| COMP EX C | 2 | 128 |
| COMP EX C | 10.5 | <30 |

Table 6 illustrates the effect of degree of prism apex rounding on scratch width. So, in general, smaller peak radii prism apexes result in maximum scratch width for a given composition when compared to larger degree peak of the same composition.

TABLE 7

SCRATCH TESTING

| Example | Peak Radius (micron) | Ave Scratch Width (micron) |
|---|---|---|
| ROUND | | |
| 1B | 6.6 | 42 |
| 3 | 6.6 | 95 |
| 4 | 6.6 | 76 |
| 5 | 6.6 | 49 |
| 6 | 6.6 | 69 |
| 7 | 6.6 | 79 |

TABLE 7-continued

SCRATCH TESTING

| Example | Peak Radius (micron) | Ave Scratch Width (micron) |
|---|---|---|
| 8 | 6.6 | 85 |
| 9 | 6.6 | 83 |

Table 7 illustrates the difference in scratch resistance for different compositions. Typically, larger scratch width implies lower scratch resistance. Addition of inorganic oxide particles to the resin system increases the scratch resistance of the cured composition. In general, a higher volume loading of inorganic oxide particles decreases the average scratch width.

TABLE 8

SCRATCH TESTING

| Example | FLAT WIDTH (micron) | Scratch width (micron) |
|---|---|---|
| FLAT | | |
| 1B | 0 | 130 |
| 1B | 2.5 | 114 |
| 1B | 4 | 87 |

Table 8 illustrates the effect of degree of prism apex flat width or truncation on scratch width. So, in general, smaller flat width prism apexes result in maximum scratch width for a given composition when compared to larger flat width of the same composition.

TABLE 9

SCRATCH TESTING

| Example | Peak Radius (micron) | Ave Scratch Width (micron) |
|---|---|---|
| ROUND | | |
| 1B | 10 | 119 |
| 10 | 10 | 144 |

Table 9 illustrates, in general, higher amounts of a surface modifier on the particle containing a reactive end group that is copolymerizable with the resin system results in smaller scratch widths. Typically, smaller scratch width implies greater scratch resistance.

Scratch width data have been presented as an indicator of durability of exemplary optical elements. In general, the greater the width of a scratch pattern, the less durable the element. Without desiring to be bound by a particular theory, the inventors believe that the stylus of the scratch tester engages and penetrates the microstructured grooves at the surface of a less durable optical element more easily thereby resulting in a relatively uniform scratch pattern. It is envisioned that a very low durability material would have a relatively large scratch width and a low variability statistic such as the standard deviation of the measurement.

It has also been observed that variability within the data, especially for optical elements with microstructured surfaces, can also be an indicator of durability. Thus, the greater the variability of the measurement, the more durable the optical element. It is thought that a more durable material is less easily engaged and penetrated by the stylus. As a result, the stylus does not track smoothly across the microstructured elements but, in fact, is caused to "bounce" from one set of grooves to another penetrating the surface of some more completely than others. The resultant scratch pattern has a combination of shorter and longer scratches. Under this circumstance, it is envisioned that a more durable optical element would present a relatively low scratch width with a greater variability statistic.

We claim:

1. A durable optical film comprising:
a polymerized optical film structure having a microstructured surface comprised of a polymerized composition comprising a resin having a refractive index of at least 1.50 and a plurality of surface modified colloidal nanoparticles of zirconia wherein the zirconia has a primary particle size of 5 to 15 nm.

2. The durable optical film according to claim 1 wherein the polymerized optical film structure has a plurality of ridges extending along a first surface.

3. The durable optical film of claim 1 wherein the total composition has a refractive index greater than 1.56.

4. The durable optical film according to claim 1 wherein the zirconia comprises 10 to 70 wt % of the microstructured surface.

5. The durable optical film according to claim 1 wherein the zirconia comprises 30 to 50 wt % of the microstructured surface.

6. The durable optical film of claim 1 wherein the plurality of surface modified colloidal nanoparticles further comprises silica nanoparticles.

7. The durable optical film according to claim 6 wherein the silica particle size is from 5 to 75 nm.

8. The durable optical film according to claim 6 wherein the silica particle size is from 10 to 30 nm.

9. The durable optical film according to claim 6 wherein the silica comprises 10 to 60 wt % of the microstructured surface.

10. The durable optical film according to claim 6 wherein the silica comprises 10 to 40 wt % of the microstructured surface.

11. The durable optical film according to claim 1 wherein the surface modified nanoparticles further comprise titania, antimony oxides, alumina, tin oxides, mixed metal oxides thereof, or mixtures thereof.

12. The durable optical film of claim 11 wherein the surface modified nanoparticles comprises a mixed metal oxide of zirconia and titania.

13. The durable optical film according to claim 12 wherein the mixed metal oxide particle size is from 5 to 15 nm.

14. The durable optical film according to claim 12 wherein the mixed metal oxide comprises 10 to 70 wt % of the microstructured surface.

15. The durable optical film according to claim 12 wherein the mixed metal oxide comprises 30 to 50 wt % of the microstructured surface.

16. The durable optical film of claim 1 wherein the nanoparticles are substantially fully condensed.

17. The durable optical film according to claim 1 wherein the polymerized composition comprises a surface treatment agent selected from the group consisting of alcohols, amines, carboxylic acid, sulfonic acids, phosphonic, acids, silanes, titanates, and mixtures thereof.

18. The durable optical film according to claim 1 wherein the surface treatment agent comprises at least one surface treatment agent that copolymerizes with the resin.

19. The optical film of claim 18 wherein the copolymerizable group of the surface treatment agent is an ethylenically unsaturated group.

20. A device comprising:
(a) a lighting device having a light-emitting surface; and
(b) the durable optical film of claim 1 placed substantially parallel to said light-emitting surface.

* * * * *

UNITED STATES PATENT AND TRADEMARK OFFICE
CERTIFICATE OF CORRECTION

PATENT NO. : 8,361,599 B2
APPLICATION NO. : 13/004274
DATED : January 29, 2013
INVENTOR(S) : Clinton L Jones et al.

It is certified that error appears in the above-identified patent and that said Letters Patent is hereby corrected as shown below:

In the Specifications:

Column 8
Line 4, Delete "ZrO2" and insert -- $ZrO_2$ --, therefor.
Line 10, Delete "ZrO2" and insert -- $ZrO_2$ --, therefor.
Line 18, Delete "polyerizable" and insert -- polymerizable --, therefor.

Column 11
Line 4, Delete "microtine" and insert -- microfine --, therefor.

Column 14
Line 20, Delete "cutoff" and insert -- cutoff. --, therefor.

Column 19
Line 64, Delete "SiO2." and insert -- $SiO_2$. --, therefor.

Column 20
Line 2, Delete "SiO2." and insert -- $SiO_2$. --, therefor.
Line 23, Delete "SiO2" and insert -- $SiO_2$ --, therefor.
Line 30, After "2" insert -- . --.

Column 21
Line 20, Delete "NH3)" and insert -- $NH_3$) --, therefor.
Line 33, Delete "ZrO2" and insert -- $ZrO_2$ --, therefor.

Column 22
Line 26, Delete "sysringe" and insert -- syringe --, therefor.

Signed and Sealed this
Seventh Day of May, 2013

Teresa Stanek Rea
*Acting Director of the United States Patent and Trademark Office*

CERTIFICATE OF CORRECTION (continued)
U.S. Pat. No. 8,361,599 B2

Column 23
Line 41, Delete "SiO2." and insert -- $SiO_2$. --, therefor.

In the Claims:

Column 28
Line 63, In Claim 17, delete "phosphonic," and insert -- phosphonic --, therefor.